United States Patent
Yoshikawa

(10) Patent No.: US 6,697,305 B2
(45) Date of Patent: Feb. 24, 2004

(54) MAGNETIC HEAD WITH SECTIONED MAGNETIC FIELD REGULATOR

(75) Inventor: Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 10/085,391

(22) Filed: Feb. 28, 2002

(65) Prior Publication Data

US 2003/0099053 A1 May 29, 2003

(30) Foreign Application Priority Data

Nov. 27, 2001 (JP) .................................... 2001-360907

(51) Int. Cl.$^7$ ................................................ G11B 5/02
(52) U.S. Cl. ............................ 369/13.22; 369/13.23; 360/59
(58) Field of Search .......................... 369/13.02, 13.17, 369/13.22, 13.23; 360/126, 59, 22

(56) References Cited

U.S. PATENT DOCUMENTS

| | | | | |
|---|---|---|---|---|
| 5,642,336 A | * | 6/1997 | Albertini et al. | 369/13.17 |
| 5,872,693 A | * | 2/1999 | Yoda et al. | 360/126 |
| 5,978,320 A | | 11/1999 | Nakaoki et al. | 369/13 |
| 2002/0097639 A1 | * | 7/2002 | Ishizaki et al. | 369/13.13 |

FOREIGN PATENT DOCUMENTS

| | | |
|---|---|---|
| JP | 9-035937 | 2/1997 |
| JP | 10-320863 | 12/1998 |

* cited by examiner

Primary Examiner—Andrew L Sniezek
Assistant Examiner—Rocio Colon
(74) Attorney, Agent, or Firm—Greer, Burns & Crain, Ltd.

(57) ABSTRACT

A magnetic head includes a multi-layer coil for generating a magnetic field, and a flat, magnetic field regulator spaced from the coil along the central axis of the coil. The field regulator is formed with a center hole for passing disk-illuminating light. The magnetic member consists of a plurality of sections that are electrically insulated and arranged around the central axis of the coil.

14 Claims, 6 Drawing Sheets

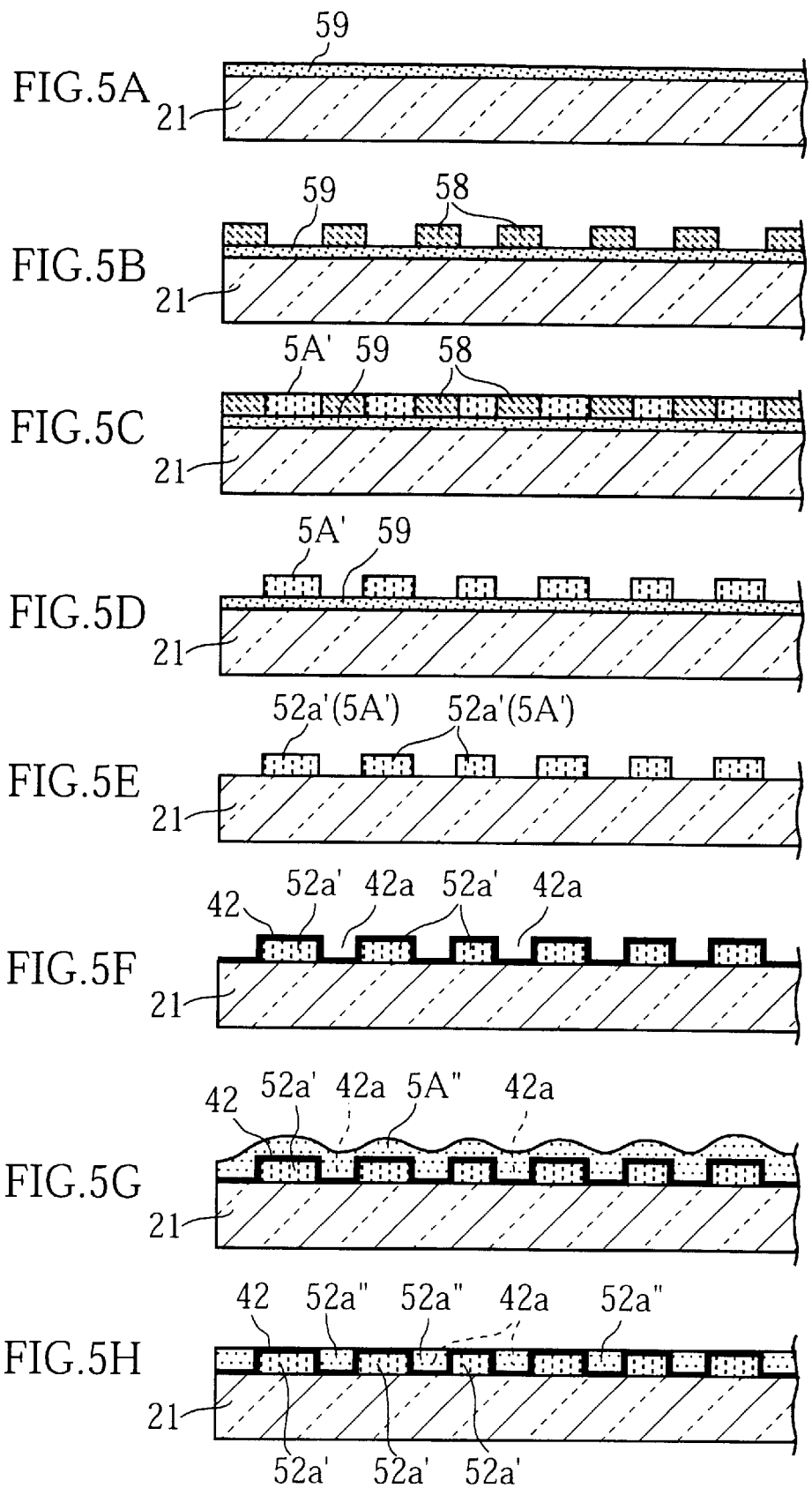

MAGNETIC HEAD WITH SECTIONED MAGNETIC FIELD REGULATOR

BACKGROUND OF THE INVENTION

1. Field of the Invention

The present invention relates to a magnetic head provided with a sectioned magnetic field regulator cooperating with a magnetic field generating coil. Further, the present invention relates to a data recording apparatus incorporating such a magnetic head and to a magnetic head fabrication method.

2. Description of the Related Art

To handle the proliferation of ever-larger digital files, several data-writing techniques have been developed to enable the condensation of data into a small space in a data storage medium such as a magneto-optical (MO) disk. Among the techniques is "magnetic field modulation." To implement magnetic field modulation, a target region in the recording layer of an MO disk is heated up to a certain temperature near the Curie point by application of a laser beam, and then the heated region of the recording layer is exposed to the magnetic field generated by a coil. The applied magnetic field is modulated in frequency to control the direction of magnetization in the target region.

To achieve a high data transfer rate by the magnetic field modulation, it is necessary to drive the field-generating coil at high frequency. As known in the art, induced current generated in the coil increases in proportion to the product of the driving frequency and the coil inductance. Thus, to avoid a large induced current in a high-frequency driving mode, the inductance of the coil should be as low as possible. To provide a low inductance, the coil may need to have a small diameter. However, with the use of a small coil, it may be difficult to subject the target region of an MO disk to effective exposure to the magnetic field generated by the coil.

One approach to overcoming the above problem is suggested in JP-A-10(1998)-320863. Specifically, JP-A-10(1998)-320863 discloses a magnetic head shown in FIG. 7 of the present application. As illustrated, the conventional magnetic head includes a magnetic field regulating disk 90 and a coil 91 arranged close to but insulated from the disk 90. With such an arrangement, the disk 90 is magnetized by the coil 91 being energized, and an appropriate magnetic field is applied to the laser-irradiated target region in the recording layer of the MO disk.

While the above magnetic head is functional in many respects, it still suffers the following drawbacks.

When the coil 91 is operated at a high frequency, an eddy current is induced in the field regulating disk 90 in response to the variation of the magnetic field. Due to the induced current, heat is generated in the field regulating disk 90, to eventually raise the temperature of the coil 91. When overheated, the coil 91 may be damaged or even broken due to e.g. "electromigration". Further, when the temperature of the coil 91 rises, the electric resistance of the coil 91 also increases. In this situation, the coil 91 needs more power for providing the required magnetic field. Disadvantageously, the increased power will additionally heat up the coil 91, which may hasten the breakage of the coil 91.

SUMMARY OF THE INVENTION

The present invention has been proposed under the circumstances described above. It is, therefore, an object of the present invention to provide a magnetic head in which the amount of induced current generated in the magnetic field regulator is reduced, whereby the temperature rise in the field regulator and the coil is properly controlled. Another object of the present invention is to provide a fabrication method whereby a magnetic field regulator used for such a magnetic head is easily made.

According to a first aspect of the present invention, there is provided a magnetic head that includes: a coil that generates a magnetic field and has an axis; and a magnetic member spaced from the coil along the axis and formed with a center hole. The magnetic member includes a plurality of sections that are electrically insulated from each other and arranged around the above axis.

With such an arrangement, it is possible to reduce the unwanted heat generation caused by the induced current in the magnetic member. As a result, the temperature rise in the coil is properly controlled, whereby the damaging of the coil and unacceptable increase in power consumption are avoided.

Preferably, the sections may be separated from each other by gaps extending radially from said axis. Each of the gaps may be filled with dielectric material.

Preferably, the magnetic member may be positioned farther away from a data storage medium than the coil is. As a result, the coil is arranged between the data storage medium and the magnetic member.

Preferably, the magnetic head of the present invention may further include a dielectric layer that encloses the coil and the magnetic member.

Preferably, the above sections may have a minimum width that is no smaller than the thickness of the sections and no greater than twice the thickness of the sections.

Preferably, the magnetic member may include a first magnetic layer and a second magnetic layer that is stacked on the first magnetic layer via a dielectric layer.

Preferably, the magnetic head of the present invention may further include an objective lens for forming a beam spot on a data storage medium. In this instance, a light beam emitted from a light source may first enter the objective lens, and then pass through the center hole of the magnetic member and the center of the coil, before it is reflected on the storage medium.

Preferably, the above-mentioned sections of the field regulator may be divided into a first group and a second group in a manner such that the first group sections and the second group sections are disposed to alternate with each other in the circumferential direction of the magnetic member.

Preferably, the magnetic head of the present invention may further include a dielectric film for covering the first group sections. The dielectric film may provide a plurality of recesses between the first group sections. In these recesses, the second group sections are accommodated.

According to a second aspect of the present invention, there may be provided a method of forming a magnetic member on a substrate, wherein the magnetic member includes a plurality of sections separated from each other. The method may include the following steps.

First, a plurality of first magnetic sections, separated from each other, may be formed on a substrate. Then, a dielectric layer may be formed on the substrate to cover the first magnetic sections in a manner such that the dielectric layer defines a plurality of recesses between the first magnetic sections. Then, a second magnetic section may be formed in each of the recesses.

In this manner, the first magnetic sections can be formed at a wide pitch that is sufficient to accommodate the second magnetic sections to be formed later. Thus, the forming operation of the first magnetic sections is performed easily. After the completion of the first sections, a dielectric layer is formed to cover the first sections. Thus, the second magnetic sections to be formed will not be electrically connected to the first magnetic sections. Since there is no need to worry about the short-circuiting with the first magnetic sections, the second magnetic sections can be formed readily with a small pitch with respect to the prefabricated first magnetic sections.

Preferably, the first and the second magnetic sections may be formed by plating.

According to a third aspect of the present invention, there is provided a magneto-optical data recording apparatus that includes: a spindle motor for rotating a magneto-optical data storage medium; a light source for irradiating the storage medium with a light beam; a magnetic head that includes a magnetic field generating coil and a magnetic member, the coil having an axis, the magnetic member being spaced from the coil along said axis and formed with a center hole; and an optical detector that detects reflection light from the storage medium and outputs a detection signal. The magnetic member includes a plurality of sections that are insulated from each other and arranged around said axis.

Other features and advantages of the present invention will become apparent from the detailed description given below with reference to the accompanying drawings.

BRIEF DESCRIPTION OF THE DRAWINGS

FIGS. 5A~5H illustrate a fabrication method of making the magnetic field regulator shown in FIG. 3;

DETAILED DESCRIPTION OF THE PREFERRED EMBODIMENT

The preferred embodiments of the present invention will be described below with reference to the accompanying drawings.

Figure 1:
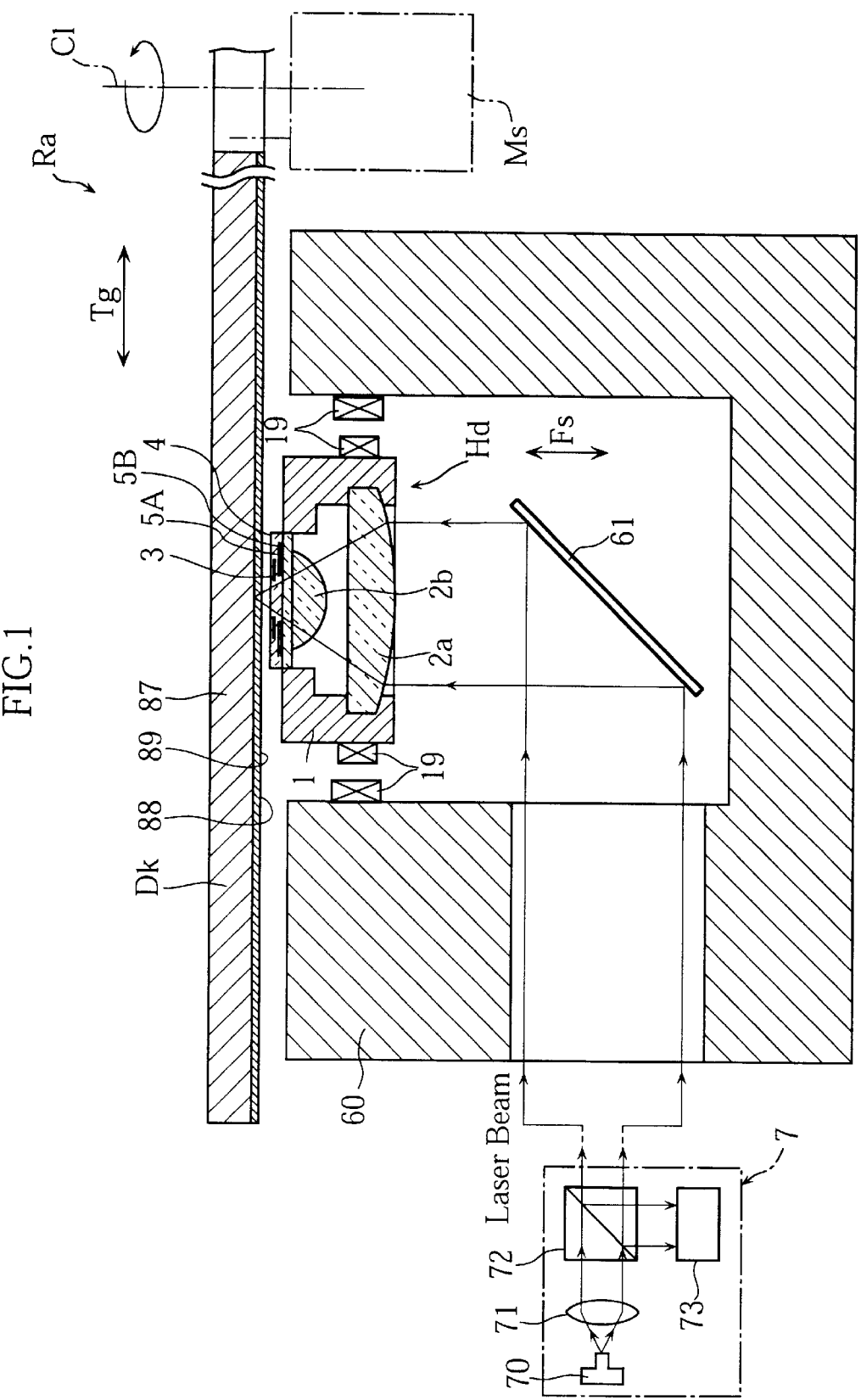
FIG. 1 is a sectional view showing a magneto-optical data recording apparatus according to a first embodiment of the present invention.

FIGS. 1~4 illustrate a magneto-optical data recording apparatus according to a first embodiment of the present invention. As shown in FIG. 1, the recording apparatus (generally indicated by Ra) is provided with a magneto-optical head Hd held in facing relation to a magneto-optical disk Dk. The head Hd includes a lens holder 1, two objective lenses 2a~2b held by the holder 1, a coil 3 for magnetic field generation, a dielectric 4 enclosing the coil 3, and two magnetic field regulators 5A~5B.

The lens holder 1 is supported by a carriage 60 movable in a tracking direction Tg (radially of the disk Dk). To actuate the carriage 60 in the direction Tg, use may be made of a voice coil motor (not shown). Appropriate movement of the carriage 60 in this direction ("seek operation") brings the lens holder 1 close to the desired track of the disk Dk. To enable tracking control, the lens holder 1 is mounted on the carriage 60 via a fine actuator (not shown). On being energized, the fine actuator minutely shifts the lens holder 1 in the tracking direction Tg. Further, the lens holder 1 can be moved in a focus direction Fs by an electromagnetic actuator 19.

In operation, the disk Dk is rotated at high speed about the axis C1 (FIG. 1) by a spindle motor Ms. The disk Dk is made up of a transparent substrate 87, a recording layer 88 formed on one side of the substrate 87, and a transparent insulating layer 89 to protect the recording layer 88. In the illustrated embodiment, the head Hd is held in direct facing relation to the recording layer 88 without intervention of the substrate 87 ("front illumination type").

The recoding apparatus Ra includes a stationary optical unit 7 made up of a laser diode 70, a collimating lens 71, a beam splitter 72, an optical detecting device 73, etc. The optical unit 7 emits a laser beam toward the carriage 60 in which a mirror 61 is provided. The emitted laser beam is reflected upward by the mirror 61, to pass through the objective lenses 2a, 2b. The laser beam is caused to converge by these lenses, thereby making a beam spot on the recording layer 88. After being reflected on the recording layer 88, the laser beam traces back the previous path. Then, the laser beam is received by the optical detecting device 73 in the optical unit 7.

Figure 2:
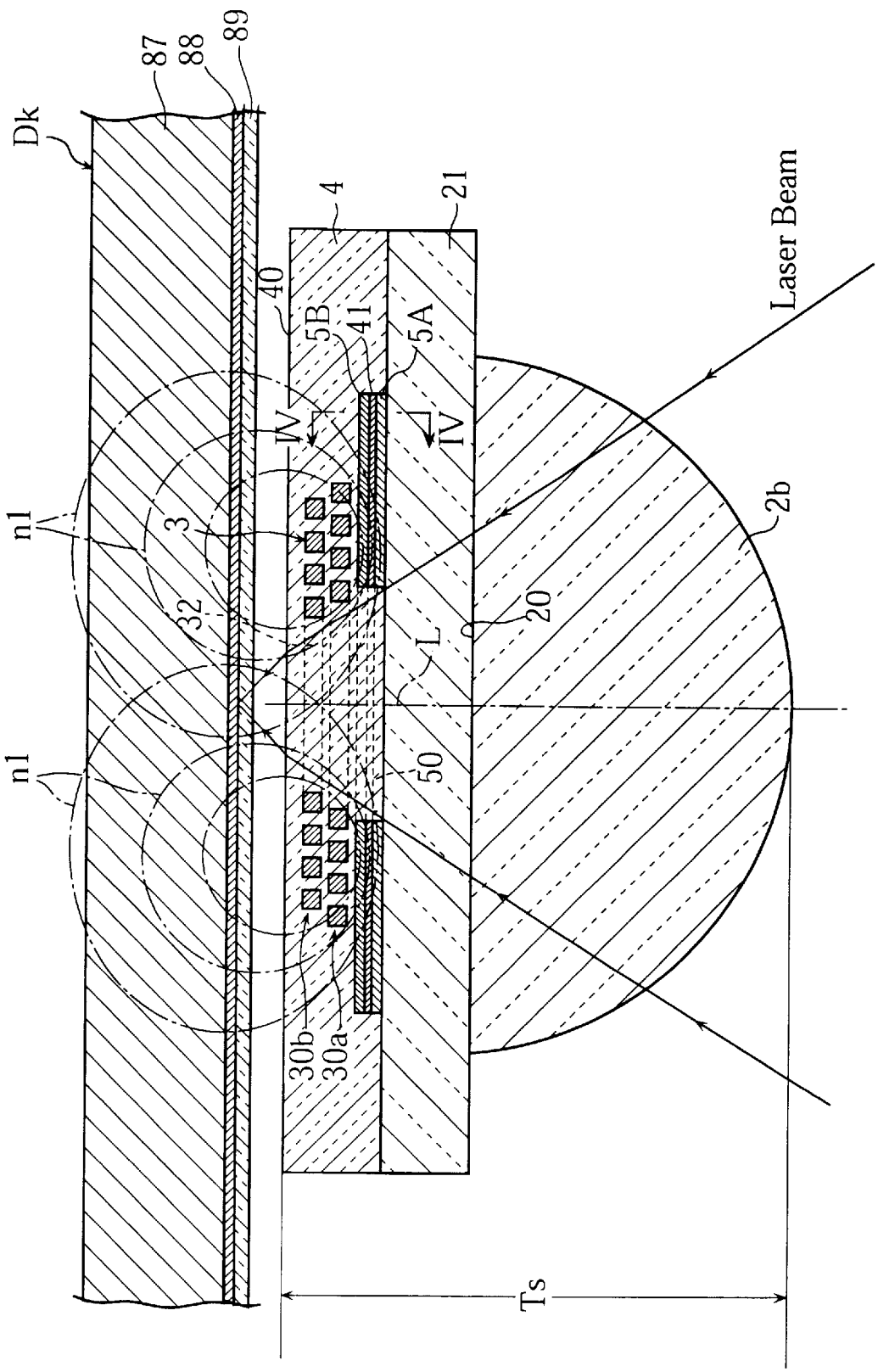
FIG. 2 is a sectional view showing the principal components of the magnetic head used in the apparatus of FIG. 1.

As shown in FIG. 2, the objective lens 2b has a flat, upper lens surface 20 attached to a substrate 21. The lens 2b and the substrate 21 are both made of a transparent glass material and their refractive indexes are the same or substantially same.

A first magnetic field regulator 5A, a second magnetic field regulator 5B, a coil 3 and a dielectric 4 are provided on the substrate 21. The dielectric 4, which may be made of a transparent material such as alumina or silicon dioxide, has the same or substantially same refractive index as the substrate 21 (and hence the lens 2b). With the equality of refractive indexes, the combination of the lens 2b, the substrate 21 and the dielectric 4 serves as a single lens. This compound lens has a predetermined thickness Ts, as shown in FIG. 2.

The coil 3 may be made by pattern a copper layer. Specifically, the "wafer process" known in the field of semiconductor device fabrication can be utilized in forming a prearranged copper layer into the required spiral. The coil 3 has a two-layer structure consisting of a first conductive spiral 30a and a second conductive spiral 30b. The central axis L of the coil 3 coincides with the axes of the objective lenses 2a, 2b. Though not shown in the figures, the coil 3 is connected to an external power source via conductive leads laid in the dielectric 4 or on the surface of the substrate 21. The two-layer structure of the coil 3 is not essential for the present invention, so that the coil 3 may consist of only one spiral or more than two spirals.

The dielectric 4, enclosing the coil 3 and the magnetic field regulators 5A~5B, has a flat surface held in facing relation to the disk Dk. The dielectric 4 fills the center of the coil 3, to provide a light-permeable portion 32 through which the laser beam passes. To lower the inductance of the coil 3, the inner diameter of the coil 3 is made as small as possible, while allowing enough room for the laser beam to pass.

The magnetic field regulators 5A, 5B may have a thickness of 5 $\mu$m. The material that forms the field regulators 5A, 5B has a higher thermal conductivity than the material that forms the dielectric 4. Thus, the field regulators 5A, 5B can serve as a heat sink for dissipation of the heat generated at the coil 3. The field regulators 5A, 5B may be made of permalloy (nickel-iron alloy). The two field regulators 5A, 5B sandwich an intermediate layer 41 made of a dielectric material. The field regulators 5A, 5B are disposed between the coil 3 and the substrate 21. In other words, the field regulators 5A, 5B are opposite to the disk Dk with respect to the coil 3. The center of the respective field regulators 5A, 5B coincides with the center L of the coil 3.

Figure 3:
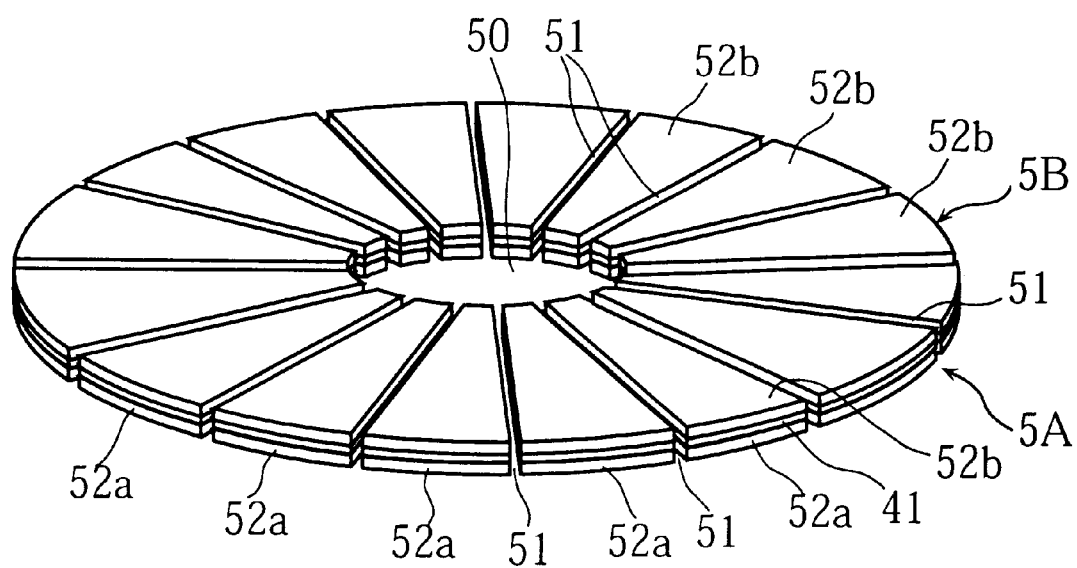
FIG. 3 is a perspective view showing a magnetic field regulator used for the magnetic head shown in FIG. 2.

The assembly of the magnetic field regulators 5A, 5B is provided with a central hole 50 for passing the laser beam from the lens 2b. As shown in FIG. 3, the magnetic field regulators 5A and 5B are divided by radially extending slits 51 into identical sectors 52a and 52b, respectively. The slits 51 are filled with dielectric material to enable electrical insulation of the sectors 52a (and the sectors 52b as well). The dielectric material may be transparent or nontransparent.

Figure 4:
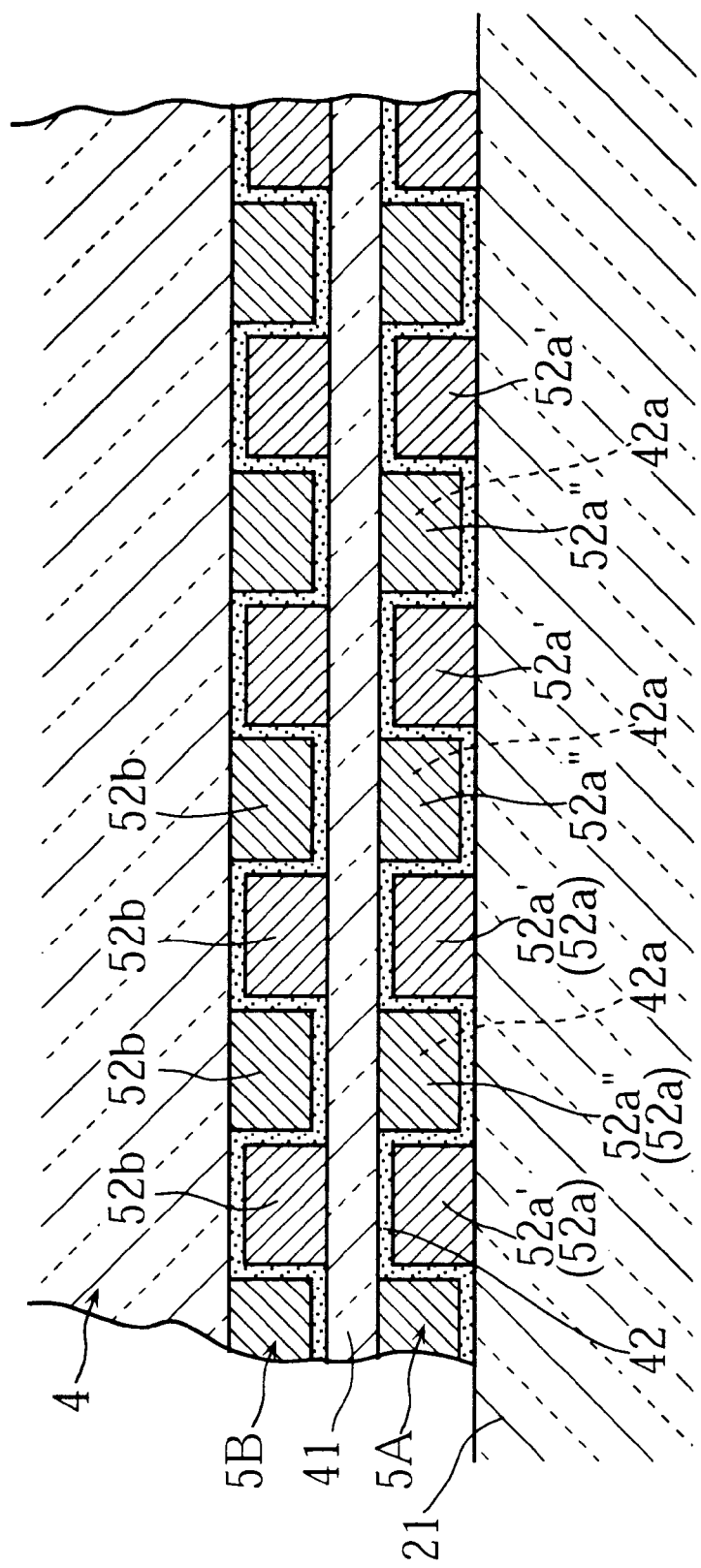
FIG. 4 is a sectional view taken along lines IV—IV in FIG. 2.

FIG. 4 shows a sectional view of the structure of the magnetic field regulators 5A, 5B taken along a line extending circumferentially of the regulator assembly shown in FIG. 3. As readily seen, the magnetic field regulator 5A and the magnetic field regulator 5B are the same in structure. Thus, though only the regulator 5A is described below, the same description holds for the other regulator 5B.

The magnetic field regulator 5A is composed of a plurality of identical sectors 52a. As shown in FIG. 4, these sectors can be divided into two groups. A first group of sectors (designated as 52a') are disposed lower than a second group of sectors (designated as 52a"). The lower sectors 52a' alternate with the higher sectors 52a" in the circumferential direction of the regulator assembly. The first-group sectors 52a' are arranged on the substrate 21, while the second-group sectors 52a" are offset upward from the substrate 21. The sectors 52a' are electrically insulated from the sectors 52a" by a dielectric layer 42 that covers the upper surface and side surfaces of each sector 52a'. The dielectric layer 42 defines upwardly open recesses 42a in which the sectors 52a" are accommodated. The above-mentioned slits 51 correspond to the gaps between the sectors 52a' and the sectors 52a.

The magnetic field regulator 5A (and the field regulator 5B as well) may be fabricated in the following manner.

As shown in FIG. 5A, a titanium or chromium layer 59 as an undercoat is formed on a substrate 21 by vapor deposition or sputtering for example. The layer 59 may have a submicron thickness. Then, as shown in FIG. 5B, a resist mask 58 is formed on the titanium layer 59. The uncovered portions of the layer 59 correspond in position to the sectors 52a' shown in FIG. 4. Then, as shown in FIG. 5C, the gaps of the resist mask 58 are filled with a magnetic material (permalloy) 5A' by plating. Thereafter, the mask 58 is removed by e.g. washing, as shown in FIG. 5D. Further, the exposed portions of the titanium layer 59 are removed by e.g. ion milling, as shown in FIG. 5E. Thus, the sectors 52a' are obtained.

Then, as shown in FIG. 5F, a dielectric layer 42 (made of alumina for example) is formed on the substrate 21 and on the sectors 52a' by e.g. sputtering. Thus, upwardly open recesses 42a are made between the sectors 52a'. Then, though not shown in the figures, a titanium or chromium undercoat (like the one shown in FIG. 5A) is formed on the dielectric layer 42 by plating. Then, as shown in FIG. 5G, a permalloy layer 5A" is formed by plating so that the recesses 42a are filled up. Then, as shown in FIG. 5H, the surface of the permalloy layer 5A" is leveled by e.g. chemical mechanical polishing. The remaining portions of the layer 5A" serve as the sectors 52a" shown in FIG. 4.

Advantageously, the plating for forming the sections 52a (52a' and 52a") of the field regulator 5A can be performed more readily and at lower cost than vapor deposition or sputtering. Further, in the above process, it is possible to form the first-group sections 52a' at a large pitch before forming the second-group sections 52a". Thus, the patterning for the sections 52a' can be performed readily. The latter formed second-group sections 52a" are reliably insulated from the first-group sections 52a' by the intermediate dielectric layer 42.

After the field regulator 5A is made, an intermediate layer 41 is formed on the field regulator 5A. Then the field regulator 5B is fabricated in the same manner as the field regulator 5A.

The function of the magnetic head Hd will now be described below.

When data-writing to an MO disk Dk is performed by magnetic field modulation, a high-frequency driving current (no less than 20 MHz for example) is supplied to the coil 3. Upon application of the current, the coil 3 generates a magnetic field (the sign n1 in FIG. 2 refers to lines of magnetic force). At the beam spot forming point on the recording layer 88, the direction of the lines of magnetic force is generally perpendicular to the recording layer 88. Some of the magnetic force lines enter the field regulators 5A, 5B. In the high-frequency operation of the coil 3, the magnetic flux density of the lines piercing the sectors 52a or 52b varies in the radial direction of the sectors.

Figure 6A:
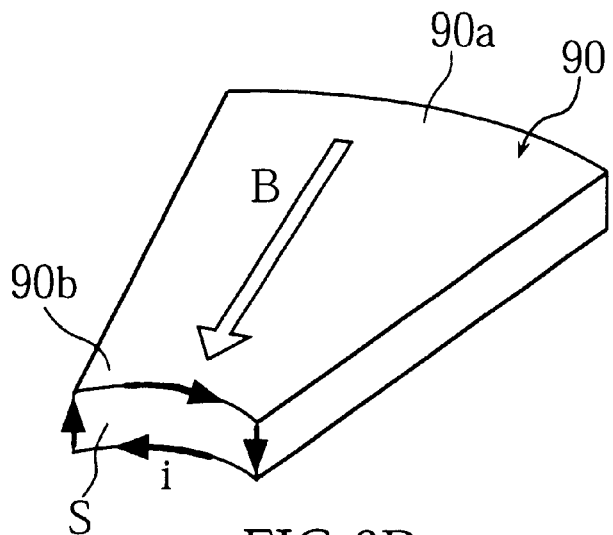
FIGS. 6A and 6B illustrate an induced current caused in fan-shaped magnetic sections of different size.

To make the present invention better understood, reference is now made to FIG. 6A illustrating a fan-shaped element 90 made of magnetic material. When the magnetic flux density B increases from the outer edge 90a to the inner edge 90b, a clockwise electric current i is induced in the inner end of the element 90, thereby producing a magnetic field to act against the change in the density B. Supposing that the strength of the magnetic field induced within the element 90 is denoted by E, the current density resulting from the magnetic field induction by j, and the power consumption by W, then the following relation holds.

$$W = \iiint_V E \cdot j \cdot dv = \iiint_V \frac{E^2}{\rho} \cdot dv \qquad (1)$$

where $\rho$ is the volume resistivity of the element 90, and V is the volume of the element 90.

As seen from the above equation (1), the power consumption W can be reduced by making smaller the strength E. Here, the strength E and the magnetic flux density B satisfy the following equation (one of the four Maxwell equations).

$$rot \cdot E = -\frac{\partial B}{\partial t} \qquad (2)$$

According to Stokes' theorem, the above equation (2) yields the following relation.

$$\oint_C E \cdot dl = -\int\int_S \frac{\partial B}{\partial t} \cdot ds \quad (3)$$

where C represents the integral path (the oriented contour of the inner end of the element 90), and S is the area of the inner end of the element 90.

When the strength E and the density B are constant in the above equation (3), the following equation holds.

$$l \cdot E = -S \cdot \frac{\partial B}{\partial t} \quad (4)$$

where l is the total length of the contour of the inner end of the element 90.

From the above equation (4), the following equation results.

$$E = -\frac{S}{l} \cdot \frac{\partial B}{\partial t} \quad (5)$$

As seen from the above equation (5), in order to reduce the absolute value of the strength E of the magnetic field, the area S may be reduced or the length l may be increased.

Figure 6B:
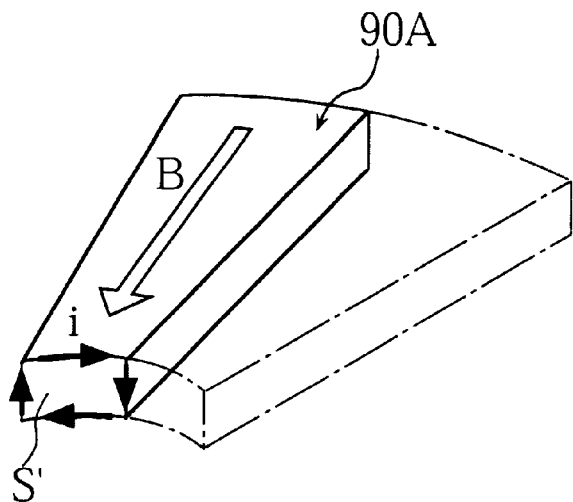
Figure 7:
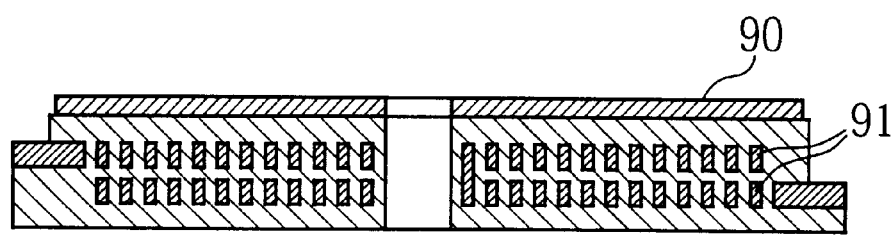
FIG. 7 is a sectional view showing the principal components of a conventional magnetic head.

Referring now to FIG. 6B, a smaller fan-shaped magnetic element 90A is shown. The element 90A is an exact half of the element 90 described above. Thus, the area S' of the inner end is ½ of the area S of the element 90. However, the total circumferential length of the area S' is not reduced to half the circumferential length of the area S. This means, based on the above equation (5), that the magnetic field for the smaller element 90A is weaker than that for the larger element 90 since the coefficient $$\frac{S}{l}$$

of the equation (5) is smaller for the case of the element 90A than for the case of the element 90. As seen from the equation (1), with the weaker magnetic field, the power consumption W can be made smaller.

As proved above, the power consumption in a fan-shaped magnetic element can be reduced by decreasing the width of the element (the size in a direction perpendicular to the magnetic flux). According to the illustrated embodiment of the present invention, the magnetic flux adjustors 5A, 5B are divided into smaller sections 52a or 52b. Thus, as compared with a case where no such division is provided, the power consumption in the field regulators 5A, 5B is reduced, whereby the heat generation in them is reduced. As a result, an unacceptable temperature rise in the coil 3 is prevented.

The above advantageous effect becomes more conspicuous as the field regulators 5A, 5B are divided into a greater number of sectors 52a, 52b, thereby reducing the width of each fan-shaped sector. As an example, the width of the inner end (i.e., the minimum width) of the sectors 52a, 52b may be 5~10 μm when the thickness of the sectors is 5 μm. Preferably, the ratio of the thickness to the minimum width is 1 to 1. Along this line, when the thickness of the sectors is 5 μm, the width of the inner end of each sector is also 5 μm. Supposing that the circumferential length of the hole 50 in the field regulators 5A~5B is 500 μm and that the width of each slit 51 (see FIG. 3) is 2 μm, each of the magnetic field regulators 5A, 5B may be divided into 71 sectors to make the width of the inner end of each sector about 5 μm (500÷71−2≅5.0).

In the above-described embodiment, use is made of a two-layer structure for the field regulators. This is advantageous to making small the area of the inner end of each sector, while allowing a rather long circumferential length for the sector. Thus, as compared to an instance where a single-layer structure (only one magnetic field regulator) is adopted, the field regulator generates less heat.

Further, the field regulators 5A, 5B have a higher thermal conductivity than the dielectric 4. Thus, they serve as an excellent heat sink for dissipation of the heat generated by the coil 3. As a result, it is possible to reliably control the temperature rise in the coil 3. The control of the temperature rise in the coil 3 contributes to prevention of the electromigration in the coil 3 and prevention of the increase in electric resistance of the coil 3. Accordingly, the power consumption in the magnetic head Hd is advantageously reduced. Further, since the temperature rise in the magnetic field regulators 5A, 5B is controlled, a higher-frequency driving current can be applied to the coil 3, whereby a high data transfer rate can be achieved.

According to the present invention, the magnetic field generating coil may be formed directly on the objective lens. The magnetic head of the present invention may be provided with a slider that floats slightly over the data storage disk in rotation. Further, the magnetic head of the present invention may not incorporate an objective lens.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A magnetic head comprising:
    a coil that generates a magnetic field and has an axis; and
    a magnetic member spaced from the coil along said axis and formed with a center hole;
    wherein the magnetic member includes a plurality of sections that are electrically insulated from each other and arranged around said axis; and
    wherein the sections are divided into a first group and a second group, the first group sections being arranged to alternate with the second group sections in a circumferential direction of the magnetic member.

2. The magnetic head according to claim 1, wherein the sections are separated from each other by gaps extending radially from said axis.

3. The magnetic head according to claim 2, wherein each of the gaps is filled with dielectric material.

4. The magnetic head according to claim 1, wherein the magnetic member is positioned farther away from a data storage medium than the coil.

5. The magnetic head according to claim 1, further comprising a dielectric layer that encloses the coil and the magnetic member.

6. The magnetic head according to claim 1, wherein the sections have a minimum width that is no smaller than a thickness of the sections and no greater than twice the thickness of the sections.

7. The magnetic head according to claim 1, wherein the magnetic member comprises a first magnetic layer and a second magnetic layer that is stacked on the first magnetic layer via a dielectric layer.

8. The magnetic head according to claim 1, further comprising an objective lens for forming a beam spot on a data storage medium.

9. The magnetic head according to claim 8, wherein a light beam, after passing through the objective lens and before reaching the storage medium, passes through the center hole of the magnetic member and a center of the coil.

10. The magnetic head according to claim 1, further comprising a dielectric film covering the first group sections, wherein the dielectric film provides a plurality of recesses between the first group sections, the recesses accommodating the second group sections.

11. A method of forming a magnetic member on a substrate, the magnetic member including a plurality of sections separated from each other, the method comprising the steps of:

forming a plurality of first magnetic sections separated from each other on the substrate;

forming a dielectric layer on the substrate to cover the first magnetic sections in a manner such that a plurality of recesses are formed in the dielectric layer between the first magnetic sections; and forming plurality of second magnetic sections each in a respective one of the recesses in a manner such that the first magnetic sections are arranged to alternate with the second magnetic sections in a circumferential direction of the magnetic member.

12. The method according to claim 11, wherein the first and the second magnetic sections are formed by plating.

13. A magneto-optical data recording apparatus comprising:

a spindle motor for rotating a magneto-optical data storage medium;

a light source for irradiating the storage medium with a light beam;

a magnetic head that includes a magnetic field generating coil and a magnetic member, the coil having an axis, the magnetic member being spaced from the coil along said axis and formed with a center hole; and an optical detector that detects reflection light from the storage medium and outputs a detection signal;

wherein the magnetic member includes a plurality of sections that are electrically insulated from each other and arranged around said axis; and wherein the sections are divided into a first group and a second group, the first group sections being arranged to alternate with the second group sections in a circumferential direction of the magnetic member.

14. A magnetic head comprising;

a coil that generates a magnetic field and has an axis; and a magnetic member spaced from the coil along said axis and formed with a center hole;

wherein the magnetic member includes a plurality of sections that are electrically insulated from each other and arranged around said axis; and wherein the sections have a minimum width that is no smaller than a thickness of the sections and no greater than twice the thickness of the sections.

* * * * *

UNITED STATES PATENT AND TRADEMARK OFFICE
CERTIFICATE OF CORRECTION

PATENT NO.     : 6,697,305 B2
DATED          : February 24, 2004
INVENTOR(S)    : Yoshikawa It is certified that error appears in the above-identified patent and that said Letters Patent is hereby corrected as shown below:

<u>Column 9,</u>
Line 18, between "forming" and "plurality" insert -- a -- therefore.

Signed and Sealed this

Thirteenth Day of July, 2004

JON W. DUDAS
*Acting Director of the United States Patent and Trademark Office*